United States Patent [19]

Townend

[11] 4,304,154

[45] Dec. 8, 1981

[54] VARIABLE RATIO TRANSMISSION MECHANISM

[75] Inventor: Gordon H. Townend, Much Wenlock, England

[73] Assignee: GKN Group Services Limited, Smethwick, England

[21] Appl. No.: 70,592

[22] Filed: Aug. 29, 1979

[30] Foreign Application Priority Data

Sep. 5, 1978 [GB] United Kingdom ............ 35644/78

[51] Int. Cl.³ .................... F16H 15/08; F16H 15/50
[52] U.S. Cl. .................................. 74/796; 74/196
[58] Field of Search ............... 74/190, 194, 196, 199, 74/793, 796; 64/14, 27 R, 27 NM

[56] References Cited

U.S. PATENT DOCUMENTS

| | | | |
|---|---|---|---|
| 722,388 | 3/1903 | Scott | 74/196 |
| 903,744 | 11/1908 | Manning | 74/196 |
| 1,010,804 | 12/1911 | Robinson | 74/196 |
| 1,225,371 | 5/1917 | Sutton et al. | 74/196 |
| 1,326,189 | 12/1919 | Fisher | 74/196 |
| 1,585,957 | 5/1926 | Amstutz | 74/196 |
| 3,323,384 | 6/1967 | Wodarka | 74/196 |

FOREIGN PATENT DOCUMENTS

| | | | |
|---|---|---|---|
| 496667 | 4/1930 | Fed. Rep. of Germany. | |
| 836439 | 6/1952 | Fed. Rep. of Germany. | |
| 1916167 | 2/1965 | Fed. Rep. of Germany. | |
| 2749150 | 5/1978 | Fed. Rep. of Germany | 74/190 |
| 844250 | 7/1939 | France | 74/196 |
| 1153572 | 5/1969 | United Kingdom. | |

Primary Examiner—C. J. Husar
Assistant Examiner—Moshe I. Cohen
Attorney, Agent, or Firm—Merriam, Marshall & Bicknell

[57] ABSTRACT

A continuously variable transmission mechanism incorporating co-axial spaced input and output rollers between which a variable ratio driving connection is established by discs which have flat faces engaged with the peripheries of the rollers. Axial movement of the assembly of discs varies their effective diameter and thus the drive ratio. A planetary gear set has one element rotatable with the input roller, a second element rotatable with the output roller and its third element constituted by a carrier and a planet gear connected to an output shaft. The engagement load between the rollers and discs is controlled in response to the torque being transmitted. The transmission provides a range of transmission ratios in a forward and reverse direction.

9 Claims, 5 Drawing Figures

VARIABLE RATIO TRANSMISSION MECHANISM

BACKGROUND TO THE INVENTION

The invention relates to continuously variable transmission mechanisms.

It has already been proposed in U.K. Patent Specification 1,153,572 to provide a continuously variable transmission mechanism including a roller assembly comprising first and second rollers separately mounted in spaced relation for rotation about a first axis, a disc assembly comprising first and second discs mounted on a disc carrier in spaced relation for rotation about one or more second axes transverse to the first axis and so that the peripheries of the rollers engage inwardly facing surfaces of the discs with the or each second axis located between the rollers. In this transmission means are also provided for urging the discs towards the first axis into frictional driving engagement with the roller peripheries. The means for urging the discs towards the first axis incorporates a spindle extending through the whole assembly and carrying the discs and is made responsive to the torque actually being transmitted by the transmission by making it responsive to the torque reaction which holds the disc carrier against rotation. The spindle extending through the centre of the assembly between the discs is loaded in tension to transmit the forces urging the discs towards the first axis between the two discs. The ratio of the transmission is varied by causing relative movement between the roller assembly and the disc assembly in a direction parallel to the first axis to vary the effective diameters on the discs which are engaged by the rollers.

The torque and power which can be transmitted by such a transmission mechanism is limited due to the limitations of the rolling friction drive and it would be desirable to be able to provide a similar compact and relatively simple transmission mechanism capable of transmitting greater power and torque, and to vary the range of ratios which can be transmitted.

SUMMARY OF THE INVENTION

According to the present invention there is provided a continuously variable transmission mechanism including a roller assembly comprising first and second rollers separately mounted in spaced relation for rotation about a first axis, a disc assembly comprising a disc carrier, first and second discs mounted on the disc carrier in spaced relation to each other for rotation about one or more second axes transverse to the first axis and so that the peripheries of the rollers engage inwardly facing surfaces of the discs with the or each second axis located between the rollers, means for urging the discs towards the first axis into frictional driving engagement with the roller peripheries, ratio varying means for causing relative movement between the roller assembly and the disc assembly in a direction parallel to the first axis to vary the ratio of the transmission and a planetary gear set disposed physically between the first and second rollers and radially inwardly of the discs and having a first element rotatable with the first roller and a second element rotatable with the second roller, the first roller constituting one driving connection to the mechanism and the third element of the planetary gear set forming the other driving connection to the mechanism.

The planetary gear set may be an epicyclic gear set of the kind having a sun gear, planet gears, a planet carrier and a ring gear all having parallel axes of rotation. Alternatively the planetary gear set may be of the kind known as a bevel gear set which has first and second axial bevel gears, a carrier co-axial with the first and second axial bevel gears and a planet gear or planet gears carried on the carrier and meshing with the axial gears. Normally the axis of each planet gear is perpendicular to the axis of the axial gears but other angular relationships can be used.

Preferably the means for urging the discs towards the first axis is responsive to the torque transmitted by the transmission so that the force applied to the discs to urge them towards the first axis is proportional to the sum of the input and output torques of the transmission. It is not possible to use the mechanism known from U.K. Patent Specification No. 1,153,572 to achieve this proportionality because the presence of the epicyclic gear set does not allow space for a spindle to pass through the centre of the transmission and transmit the reaction forces between the discs. In order to overcome this problem, the disc carrier is made in the form of a frame which surrounds the discs and rollers and transmits the reaction forces of the discs from one disc to the other around the discs and rollers.

Preferably the disc carrier is mounted to pivot about the first axis in response to the torque transmitted, the means for urging the discs towards the first axis being responsive to the pivoting of the disc assembly about the first axis such that as the angle through which the assembly pivots from a rest position increases, the discs move towards the first axis. The means for urging the discs towards the first axis may include a stub shaft supporting one disc with respect to the carrier, a threaded connection between the stub shaft and the carrier and a torque reaction connection to the carrier through the stub shaft in such a way as to tend to rotate the stub shaft and thereby urge the discs towards the first axis.

Preferably the first roller forms the input and the third element of the planetary gear set forms the output of the transmission mechanism.

Preferably the first axial bevel gear is mounted on the first roller, a second axial bevel gear is mounted on the second roller and the carrier is mounted on an axial shaft extending out through the second roller and the second bevel gear.

Alternatively the planetary gear set may be an epicyclic gear set with a ring gear rotatable with the first roller, a sun gear rotatable with the second roller and a planet carrier forming the output.

BRIEF DESCRIPTION OF THE DRAWINGS

An embodiment of the invention will now be described by way of example only with reference to the accompanying drawings in which.

DESCRIPTION OF PREFERRED EMBODIMENTS

Figure 1:
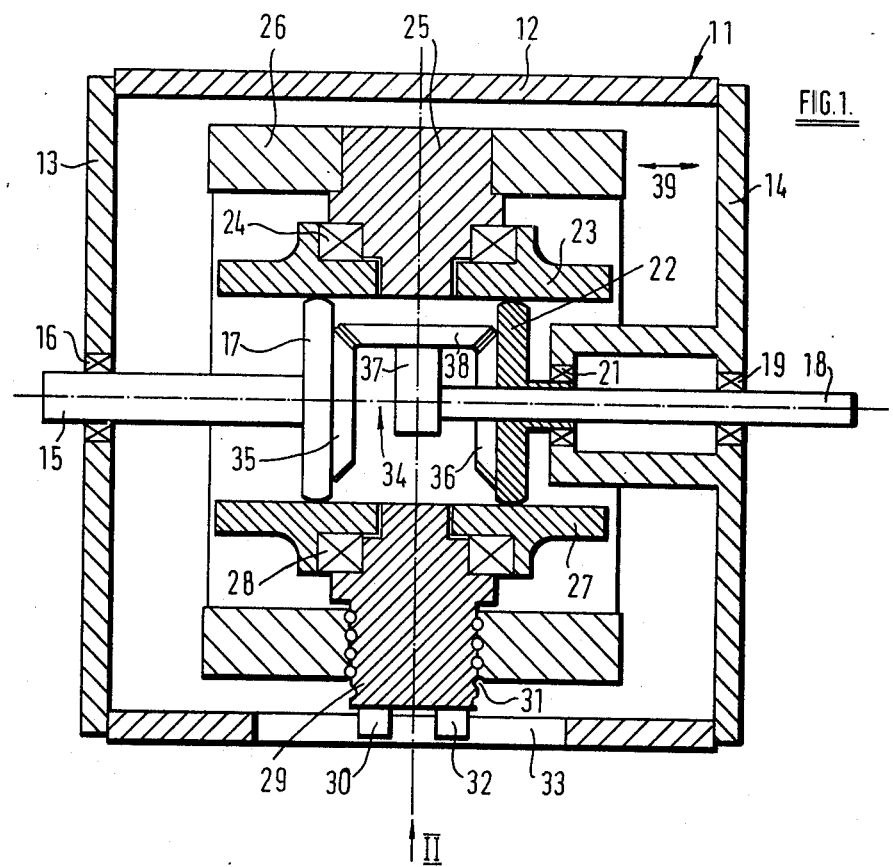
FIG. 1 is a diagrammatic cross section through a first transmission according to the invention.
Figure 2:
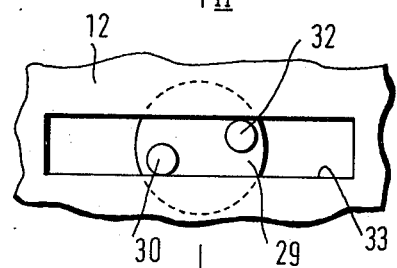
FIG. 2 is a scrap view in the direction of arrow II of FIG. 1.

The transmission shown in FIGS. 1 and 2 incorporates a stationary housing 11 made up of a main casing 12 and two end covers 13 and 14.

An input shaft 15 is carried in a bearing 16 in the end cover 13 and is drivingly connected to a first or input roller 17. An output shaft 18 is carried directly by bearing 19 and indirectly by bearing 21 in the end cover 14. A second roller 22 is mounted for rotation on the output shaft 18 and is supported in bearing 21. The two rollers 17 and 22 are of equal diameters and the outer periphery of each roller is arcuate in cross section.

A first disc 23 is carried by means of a bearing 24 and stub shaft 25 on an annular disc carrier 26. A second disc 27 similar to the first disc 23 is similarly carried by a bearing 28 and a stub shaft 29 on the disc carrier 26. Further details of the mounting of the stub shaft 29 in disc carrier 26 will be described subsequently. The discs are so arranged that their axes are radial with respect to the axis of the input shaft 15 and output shaft 18 and the discs 23 and 27 are in rolling contact with the first and second rollers 17 and 22. Thus rotation of the input shaft and roller 17 in one direction causes rotation of the discs about their own axes which in turn cause rotation of the roller 22 in the opposite direction from that of roller 17.

The mounting of stub shaft 29 in disc carrier 26 incorporates a low friction screw thread 31, in this example a ball and groove screw thread. Thus torque applied to the stub shaft 29 to tend to rotate it in one direction tends to urge the disc 27 into further contact with the rollers 17 and 22. The reaction to this force is taken by disc 23 so that disc 23 has the same contact pressure with the rollers 17 and 22 as disc 27. Torque is applied to the stub shaft 29 by means of one of two eccentric pegs 30 and 32 carried on the stub shaft 29 and in engagement in a slot 33, parallel to the input and output shafts 15 and 18, in the main casing 12. As shown in FIG. 2 slot 33 is wider than pegs 32 and 33 and these pegs are offset so that only one of them engages a respective edge of slot 33. Thus regardless of the direction of torque reaction a clamping load is established between rollers and discs. Thus any torque applied to the disc carrier 26 results in a corresponding reaction force between peg 32 and slot 33, providing a corresponding torque on the stub shaft 29 and a corresponding clamping load of the discs 23 and 27 on the rollers 17 and 22. It will be explained subsequently that the rotational torque applied to the disc carrier 26 is the reaction torque of the transmission mechanism on its housing so that the clamping force between discs and rollers is directly proportional to this reaction torque.

A planetary gear set 34 is arranged between the rollers 17 and 22 and also inwardly of the discs 23 and 27. The planetary gear set in this example is of the bevel gear type. It incorporates a first axial bevel gear 35 mounted on and rotatable with the roller 17, a second axial bevel gear 36 mounted on and rotatable with the second roller 22, a carrier 37 mounted on and rotatable with the output shaft 18 and one or more planet bevel gears 38 in mesh with the axial bevel gears and mounted for rotation with respect to the carrier 37.

The disc carrier 26 is movable axially as indicated by arrows 39. This axial movement alters the effective diameter of the discs at which they are engaged by the rollers 17 and 22 and thereby alters the transmission ratio.

Each disc has a small central non-rotating surface portion represented by a flat end portion of the respective stub shaft 25 or 29.

In this simple example in which the numbers of teeth on the two axial bevel gears are equal to each other, the operation of the transmission mechanism can be explained as follows. Due to symmetry of the planetary gear set, the angular velocity of the output shaft 18 is equal to the mean of the angular velocities of the rollers 17 and 22. With the discs 23 and 27 arranged symmetrically as shown so that their effective diameters for contact with the two rollers are equal, the two axial bevel gears rotate at equal speeds in opposite directions. This gives a zero output speed or what is sometimes termed a geared neutral condition. As the disc carrier 26 and its discs are moved axially, the effective diameters at which the rollers 17 and 22 engage the discs 23 and 27 change. For example if the disc support is moved towards the output, the effective disc diameter engaged with roller 17 becomes greater than the effective disc diameter engaged with roller 22 so that roller 22 rotates proportionately slowly as compared with rotation of roller 17. The average angular velocity of the rollers 17 and 22 then becomes a positive value (in the same sense as the input rotation) so that the output shaft rotates at a slow positive speed. Apart from minor losses in the transmission, the torque ratio is the inverse of the ratio of angular velocities.

If the disc carrier 26 is moved from the position shown towards the input end of the transmission mechanism, the converse situation applies. Roller 22 rotates in a reverse direction faster than the forward rotation of roller 17 so that the average speed, which is the output shaft speed, is a low negative (i.e., reverse) value. Clearly the degree of gear reduction can be controlled by the amount of movement of the disc carrier 26 in either direction.

Considered in another way, the transmission of power from the input to the output is split between two parallel power transmission paths. The input shaft 15, axial bevel gear 35 and planet bevel gear 38 provide one transmission path of fixed ratio to carrier 37 and output shaft 18. The input shaft 15, roller 17, discs 23 and 27, roller 22, axial bevel gear 36 and planet bevel gear 38 provide a second transmission path of a variable ratio to the carrier 37 and output shaft 18. Variation of the ratio of the second transmission path varies the overall ratio of the transmission together with the proportions of the total power through the two transmission paths.

In the extremes of movement of the disc carrier 26, one of the rollers engages the central non-rotating parts of the discs. In the central position the fact that the central part of the disc is not rotating has no effect on the ratio of the transmission and in positions close to the centre there is a very small and not particularly significant effect on the ratio. The absence of rotation helps to prevent wear and power loss.

The torque reaction applied by the gear, roller and disc assembly to the housing 11 is clearly equal to the resultant of the input and output torques (which may be in the same or opposite senses). This torque reaction is applied through pin 32 and controls the clamping force applied between the discs 23, 27 and the rollers 17, 22. In this way the clamping load is proportional to the algebraic sum of the input and output torques.

Figure 3:
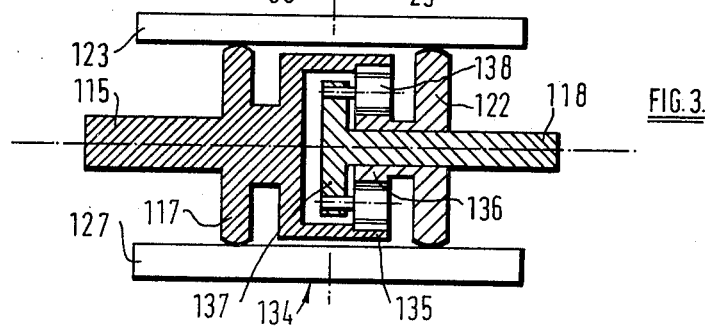
FIG. 3 is a diagrammatic cross section of a first alternative, showing only those parts of the mechanism which differ from the arrangement of FIG. 1; and, FIGS. 4 and 5 are graphs showing characteristics of the transmission mechanisms.

FIG. 3 shows a modification in which the bevel gear set 34 has been replaced by a conventional epicyclic gear set. Parts of the transmission mechanism which are not shown in FIG. 3 correspond with those shown in FIG. 1 and in addition the representation of the discs shown in FIG. 3 has been simplified but in practice these discs will correspond to the discs of FIG. 1.

The arrangement of FIG. 3 has an input shaft 115 carrying a the roller 22 of FIG. 1. There is a second roller 122 corresponding to roller 117. Two discs 123 and 127 are in rolling engagement with the rollers 117 and 122. An epicyclic gear set 134 is arranged between the rollers 117 and 122. The epicyclic gear set incorporates a ring gear 135 mounted on and rotational with the roller 117. A sun gear 136 is mounted on and rotational with the roller 122. A planet carrier 137 is mounted on and is rotational with an output shaft 118. Planet gears 138 mesh with the ring gear 135 and with the sun gear 136. The planet gears 138 are carried on and rotational about their own axes with respect to the planet carrier 137.

The operation of the transmission mechanism illustrated in FIG. 3 is similar to that of FIG. 1. The difference is that because the ring gear 135 and the sun gear 136 must have different numbers of teeth whereas the corresponding axial bevel gears 35 and 36 of FIG. 1 have equal numbers of teeth, the relationship of output shaft angular velocity to the angular velocities of the gears 135 and 136 is more complicated than the simple average which applied in relation to FIG. 1. This will be explained in greater depth subsequently when the effects of various numbers of teeth are discussed.

In the following analysis the number of teeth on the gear 35 or 135 attached to the input roller will be designated A. The number of teeth on the gear 36 or 136 attached to the output shaft will be designated C. The ratio A/C is a constant for any one transmission.

The drive ratio of the roller and disc assembly between the input roller 17 and second roller 22 (or corresponding rollers in FIGS. 3 and 4) is designated k. The value of k will always be negative as the rotational direction is reversed and in a typical transmission k should be variable between about −0.4 and −2.5 simply by moving the disc assembly axially with respect to the roller assembly. The limitation on the variation of k is a practical matter in the construction of the assembly.

The overall ratio R of the transmission mechanism is given by the formula $$R = \frac{k + A/C}{1 + A/C}.$$

For the arrangement shown in FIG. 1 the value of A/C is 1, so that the overall ratio becomes $$R = \frac{k + 1}{2}.$$

For the transmission shown in FIG. 3 the ratio A/C is approximately 2. The exact ratios will of course depend on the actual number of teeth employed.

Clearly a wide range of ratios A/C can be chosen to suit the required operating conditions of the transmission mechanism.

It is clearly desirable to limit the torque and power which have to be transmitted through the roller and disc assembly.

Figure 4:
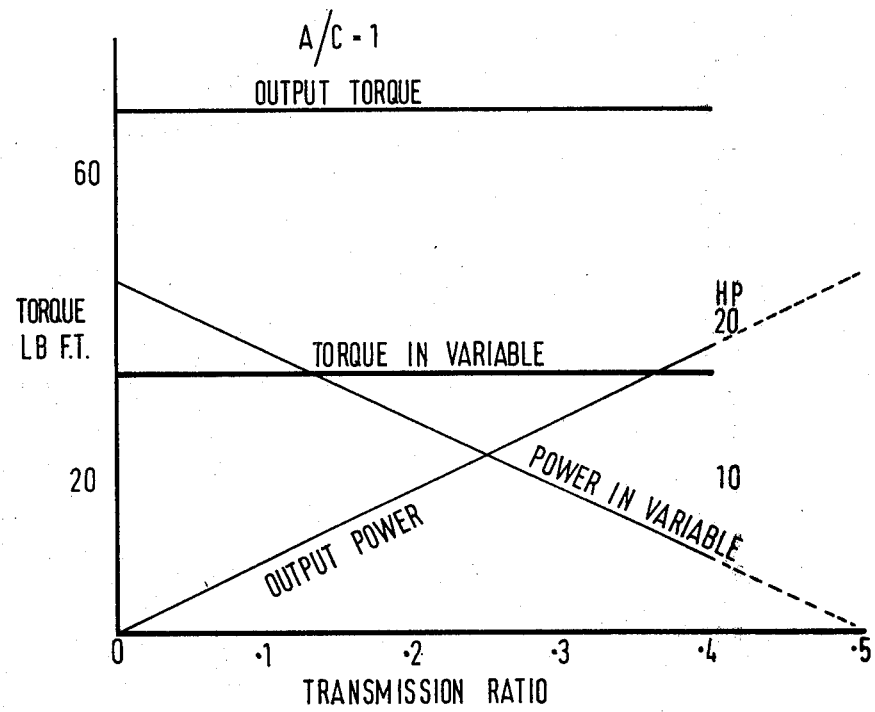

FIG. 4 illustrates how the transmission of FIG. 1, in which A/C=1 can be particularly attractive in certain types of use. For some vehicles such as small dump trucks or small tractors suitable for small agricultural or horticultural establishments, it is convenient to have an engine governed to a fixed operating speed and to control the speed of the vehicle by altering the transmission ratio. The maximum torque transmitted by such a vehicle is normally governed by slipping of the driving wheels and this effectively limits the output torque of the transmission. This is indicated by the horizontal output torque characteristic for all values of transmission ratio in FIG. 4. To produce this constant output torque, a linearly increasing output power characteristic is required as illustrated in FIG. 4.

The torque applied to the output shaft must, for equilibrium of the planet gears, be applied equally to the diammetrically opposite sides of the planet gear so that the torque applied by the roller and disc assembly to the planet gear must always be half the output torque. This is illustrated by the horizontal characteristic in FIG. 4 for "torque in variable" (that is the torque in the variable ratio roller and disc assembly). The absence of a high torque requirement for the roller and disc assembly at any transmission ratio is particularly useful because the roller and disc assembly has a limited torque capacity if excessive clamping loads and thus excessive wear is to be avoided.

In a transmission mechanism of this kind there tends to be some torque and thus power circulating within the mechanism so that the power transmitted in any one part can be greater than the total power. FIG. 4 also shows the characteristic of "power in variable", that is the power transmitted through the roller and disc assembly. This power is high at low transmission ratios but reduces to very low levels as the transmission ratio increases. If the transmission mechanism is being used in an installation where higher ratios are used for most of the time, the average power transmitted through the roller and disc assembly during an operating cycle of the vehicle should be low. This should result in small losses within the roller and disc assembly so that the overall efficiency of the transmission mechanism can be high.

Figure 5:
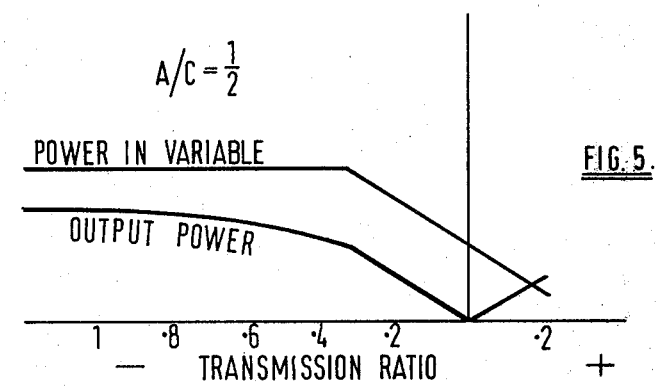

FIG. 5 shows certain characteristics for an installation in which the ratio A/C=½. In this installation the power in the variable part of the transmission, namely the roller and disc assembly is in general very much greater than the output power of the whole transmission, indicating that high efficiency is unlikely to be achieved. Despite this drawback, installations with a ratio of A/C=½ may be useful in some circumstances.

Although the invention has been described in relation to a transmission with two discs engaged with the rollers it may be desirable to employ three discs equally spaced around the rollers. This provides an increase in bearing surfaces with very little increase in bulk of the transmission mechanism.

I claim:

1. A continuously variable transmission mechanism including a roller assembly comprising first and second rollers separately mounted in spaced relation for rotation about a first axis, a disc assembly comprising a disc carrier, first and second discs mounted on the disc carrier in spaced relation to each other for rotation about second axes transverse to the first axis and so that the peripheries of the rollers engage inwardly facing surfaces of the discs with each second axis located between the rollers, means for urging the discs towards the first axis into frictional driving engagement with the roller peripheries, ratio varying means for causing relative movement between the roller assembly and the disc assembly in a direction parallel to the first axis to vary the ratio of the transmission and a three element planetary gear set disposed physically between the first and second rollers and radially inwardly of the discs and having a first element rotatable with the first roller and second element rotatable with the second roller, with one of the first roller and the third element of the planetary gear set being a drive input to the mechanism and the other one thereof being a drive output from the mechanism, the mechanism defining a first fixed ratio power transmission path through said first roller and said first and third elements of the planetary gear set and a second variable ratio power transmission path through said first roller, said discs, said second roller and said second and third elements of the planetary gear set.

2. A transmission mechanism as claimed in claim 1 wherein the means for urging the discs towards the first axis is responsive to the torque transmitted by the transmission, so that the force applied to the discs to urge them towards the first axis is proportional to the sum of the input and output torques of the transmission.

3. A transmission mechanism as claimed in claim 2 wherein the disc carrier is a frame which surrounds the discs and rollers and transmits the reaction forces of the discs from one disc to the other around the discs and rollers.

4. A transmission mechanism as claimed in claim 3 wherein the disc carrier is mounted to pivot about the first axis in response to the torque transmitted, the means for urging the discs towards the first axis being responsive to the pivoting of the disc carrier about the first axis such that as the angle through which the assembly pivots from a rest position increases, the discs move towards the first axis.

5. A transmission mechanism as claimed in claim 4 in which the means for urging the discs towards the first axis includes a stub shaft supporting one disc with respect to the carrier, a threaded connection between the stub shaft and the carrier and a torque reaction connection to the carrier through the stub shaft in such a way as to tend to rotate the stub shaft and thereby urge the discs towards the first axis.

6. A transmission mechanism as claimed in claim 1 wherein the first roller forms the input and the third element of the planetary gear set forms the output of the transmission mechanism.

7. A transmission mechanism as claimed in claim 1 wherein the planetary gear set comprises a first axial bevel gear mounted on the first roller, a second axial bevel gear mounted on the second roller and a carrier mounted on an axial shaft extending out through the second roller and the second bevel gear.

8. A transmission mechanism as claimed in any one of claims 1 to 6 wherein the planetary gear set is an epicyclic gear set with a ring gear rotatable with the first roller, a sun gear rotatable with the second roller and a planet carrier forming the output.

9. A transmission mechanism as claimed in claim 1 wherein each disc incorporates a central non-rotatable surface portion.

* * * * *